United States Patent
Sohn et al.

(10) Patent No.: US 9,720,551 B2
(45) Date of Patent: Aug. 1, 2017

(54) TOUCH WINDOW

(71) Applicant: LG INNOTEK CO., LTD., Seoul (KR)

(72) Inventors: Dong Woo Sohn, Seoul (KR); Woo Young Chang, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 4 days.

(21) Appl. No.: 14/799,999

(22) Filed: Jul. 15, 2015

(65) Prior Publication Data

US 2016/0034068 A1 Feb. 4, 2016

(30) Foreign Application Priority Data

Jul. 30, 2014 (KR) .................. 10-2014-0097156
Jul. 31, 2014 (KR) .................. 10-2014-0098508

(51) Int. Cl.
*G06F 3/044* (2006.01)

(52) U.S. Cl.
CPC .... *G06F 3/044* (2013.01); *G06F 2203/04103* (2013.01); *G06F 2203/04112* (2013.01)

(58) Field of Classification Search
CPC ............... G06F 3/044; G06F 3/047; G06F 2203/04112; G06F 2203/04103; G06F 3/041; G06F 3/0415
See application file for complete search history.

(56) References Cited

U.S. PATENT DOCUMENTS

| | | | |
|---|---|---|---|
| 2013/0017321 A1 | 1/2013 | Kim et al. | |
| 2013/0224370 A1* | 8/2013 | Cok | C23C 18/06 427/108 |
| 2013/0327560 A1* | 12/2013 | Ichiki | G06F 3/044 174/133 R |
| 2014/0043280 A1* | 2/2014 | Cok | G06F 3/0412 345/174 |
| 2014/0152917 A1* | 6/2014 | Lee | G06F 3/044 349/12 |
| 2014/0299361 A1* | 10/2014 | Nakamura | G06F 3/044 174/253 |
| 2015/0123930 A1* | 5/2015 | Singh | G06F 1/3262 345/174 |

FOREIGN PATENT DOCUMENTS

| KR | 10-2013-0008876 A | 1/2013 |
|---|---|---|
| KR | 10-2014-0054903 A | 5/2014 |
| KR | 10-2015-0009420 A | 1/2015 |

* cited by examiner

*Primary Examiner* — Md Saiful A Siddiqui
(74) *Attorney, Agent, or Firm* — KED & Associates, LLP

(57) ABSTRACT

A touch window includes a substrate, and an electrode on the substrate. The electrode includes a first mesh line, a second mesh line crossing the first mesh line and a reinforcement part adjacent to the first or second mesh line.

18 Claims, 22 Drawing Sheets

TOUCH WINDOW

CROSS-REFERENCE TO RELATED APPLICATIONS

This application claims priority under 35 U.S.C. §119 to Korean Patent Application No. 10-2014-0097156 filed Jul. 30, 2014 and No. 10-2014-0098508 filed Jul. 31, 2014, whose entire disclosures are hereby incorporated by reference.

BACKGROUND

1. Field

The embodiment relates to a touch window.

2. Background

Recently, a touch window, which performs an input function through the touch of an image displayed on a display device by an input device, such as a stylus pen, or a finger has been applied to various electronic appliances. The touch window may be typically classified into a resistive touch window and a capacitive touch window.

In the resistive touch window, the position of the touch point is detected by detecting the variation of resistance according to the connection between electrodes when pressure is applied to an input device. In the capacitive touch window, the position of the touch point is detected by detecting the variation of capacitance between electrodes when a finger of the user is touched on the capacitive touch window. When taking into consideration the convenience of a fabrication scheme and a sensing power, the capacitive touch window has been spotlighted in a smaller model touch window.

Indium tin oxide (ITO), which is a widely used material for the transparent electrode of the touch window, is expensive and is easy to be physically damaged when the substrate is flexed and bent, so that the electrode property is deteriorated. Therefore, the indium tin oxide (ITO) is not suitable for a flexible device. Further, when the ITO is applied to a touch panel having a large size, a problem occurs due to high resistance.

Researches and studies on an alternative electrode have been actively performed. For example, the study for substituting an electrode material for ITO by forming the electrode material in a mesh shape has been performed. Although such a mesh-shaped electrode may relieve the resistance problem of the large-sized touch window, the line width and thickness of each mesh line may be partially non-uniform, so that the parts having the non-uniform line width and thickness in the mesh lines may be cut off due to ESD.

BRIEF DESCRIPTION OF THE DRAWINGS

The embodiments will be described in detail with reference to the following drawings in which like reference numerals refer to like elements wherein.

DETAILED DESCRIPTION

Figure 1:
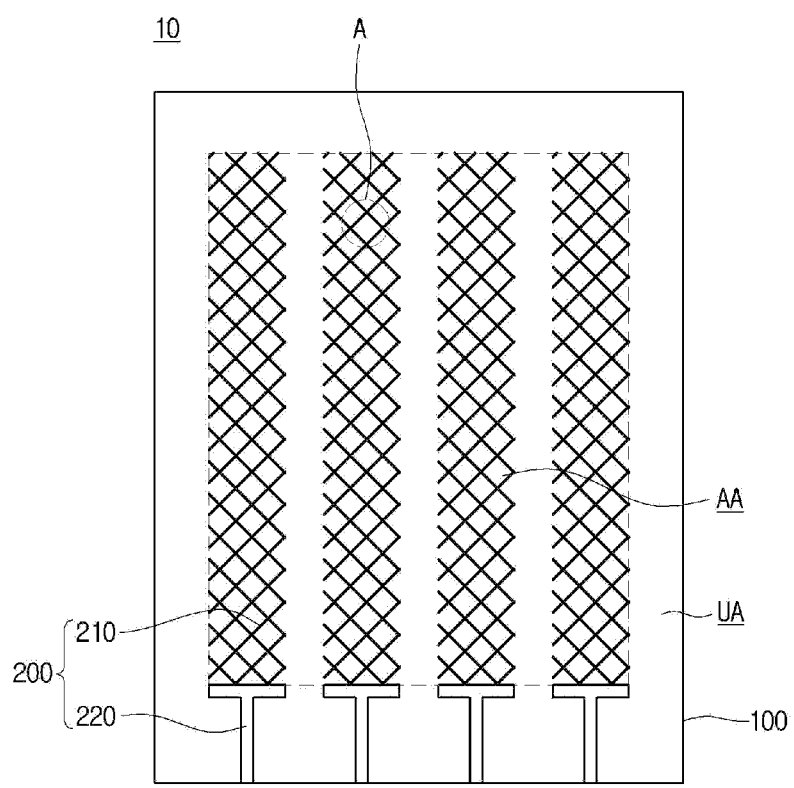
FIG. 1 is a plan view showing a touch window according to an embodiment.

Referring to FIG. 1, a touch window according to an embodiment may include a substrate 100 and an electrode 200. The substrate 100 may support the electrode 200. The substrate 100 may be a support substrate.

The substrate 100 may be flexible or rigid. For example, the substrate 100 may include glass or plastic. In detail, the substrate 100 may include chemically tempered glass such as soda lime glass or aluminosilicate glass, or plastic such as polyethylene terephthalate (PET). In addition, the substrate 100 may include an optically isotropic film. For example, the substrate 100 may include cyclic olefin copolymer (COO), cyclic olefin polymer (COP), optically isotropic polycarbonate (PC), or optically isotropic polymethyl methacrylate (PMMA).

The substrate 100 may have an active area AA and an unactive area UA defined therein. An image may be displayed in the active area AA. The image is not displayed in the unactive area UA provided at a peripheral portion of the active area AA.

In addition, the position of an input device (e.g., stylus) may be sensed in at least one of the active area AA and the unactive area UA. If the input device, such as a stylus, touches the touch window, the variation of capacitance occurs in the touched part by the input device, and the touched part subject to the variation of the capacitance may be detected as a touch point.

The electrode 200 may be disposed on the substrate 100. The electrode 200 may be disposed directly on the substrate 100 or on a base substrate 300 disposed on the substrate 100. The electrode 200 may include a sensing electrode 210 and a wire electrode 220.

The sensing electrode 210 may include a transparent conductive material that allows electricity to flow therethrough without interrupting transmission of light. For example, the sensing electrode 210 may include metal oxide such as indium tin oxide (ITO), indium zinc oxide (IZO), copper oxide, tin oxide, zinc oxide, or titanium oxide. The sensing electrode 210 may include a nanowire, a photo sensitive nanowire film, a carbon nanotube (CNT), graphene, or conductive polymer. The sensing electrode 210 may include various metals. For example, the sensing electrode 200 may include at least one of Cr, Ni, Cu, Au, Ti, Al, Ag, Mo and the alloy thereof.

Mesh lines may be defined as an electrode structure constituting a single sensing electrode unit. When the mesh lines are formed in a desired pattern such as a bar pattern shown in FIG. 1, or a polygonal pattern including a diamond pattern, the plurality of mesh lines may be disposed in a single sensing electrode unit while crossing each other.

Figure 6:
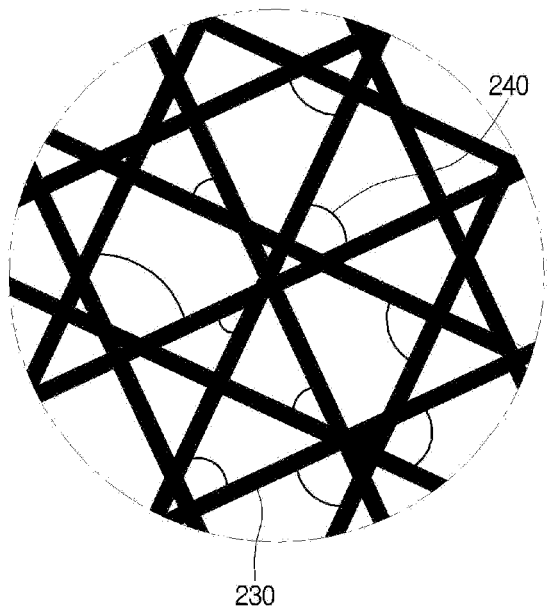

Since a mesh shape signifies a shape formed by crossing the mesh lines, the mesh shape may signifies a net shape. That is, a closing part in which the mesh lines cross each other and an opening part in which one surface of the substrate is exposed by the mesh lines may be formed on the substrate 100. The mesh lines may extend in at least two directions to cross each other. Although the mesh lines extending in two directions to cross each other are depicted in FIGS. 2 to 5, the embodiment is not limited thereto, and as shown in FIG. 6, the mesh lines may extend in at least three directions to cross each other.

Figure 2:
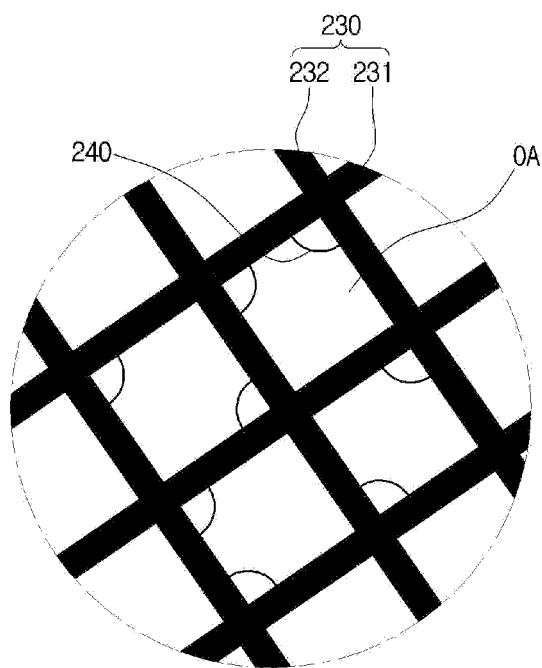
FIG. 2 is an enlarged view of area A of FIG. 1.
Figure 3:
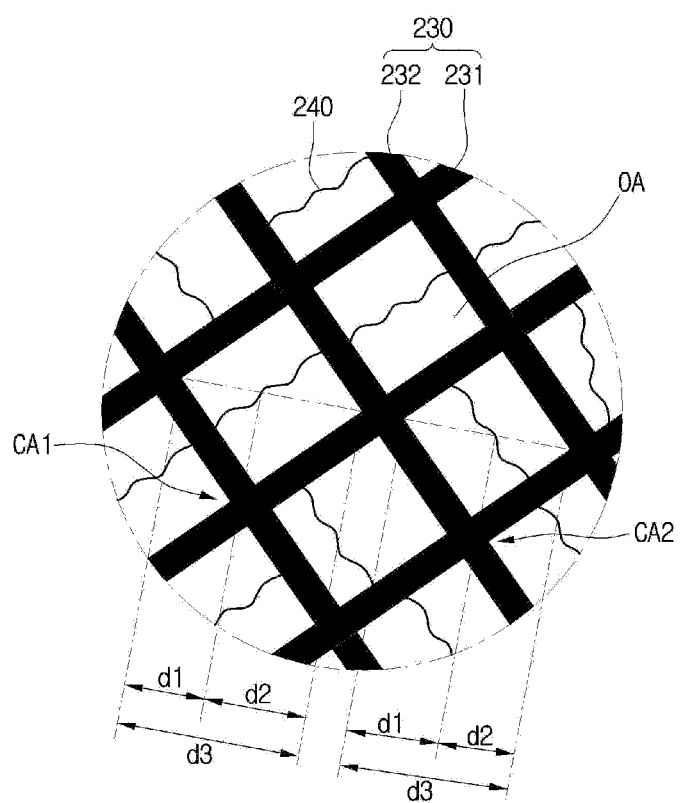
FIGS. 3 and 4 are other enlarged views of area A of FIG. 1.
Figure 4:
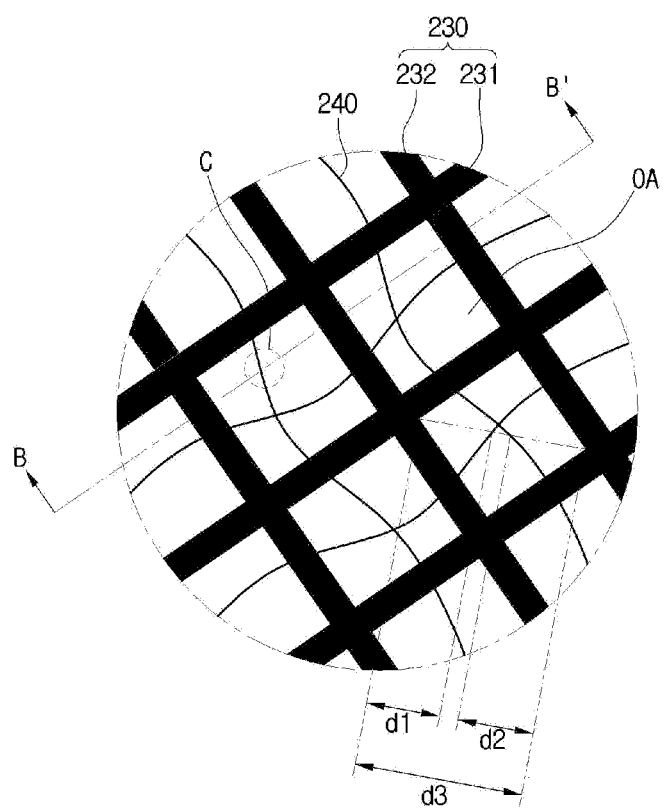
Figure 5:
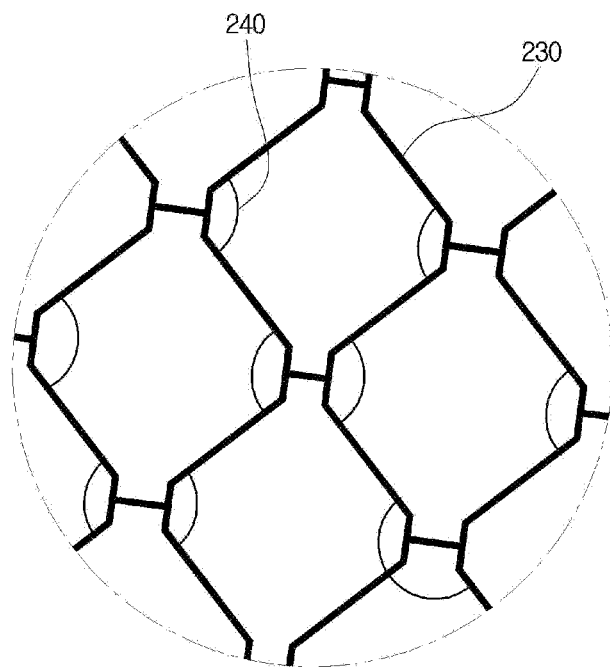
FIGS. 5 and 6 are enlarged views showing various mesh shapes of area A of FIG. 1.

The sensing electrode 210 may be disposed in a mesh shape. The sensing electrode 210 may include the mesh lines crossing each other, so that the overall shape of the sensing electrode 210 may be a mesh shape due to the mesh lines. Referring to FIGS. 2 to 4, the sensing electrode 210 may include first and second mesh lines 231 and 232. The first and second mesh lines 231 and 232 may extend in mutually different directions. For example, the first and second mesh lines 231 and 232 may extend in mutually different directions while crossing each other.

A mesh opening part OA may be formed between the first and second mesh lines 231 and 232. The mesh opening part may be the opening part through which the substrate is exposed. The mesh opening part OA may have various shapes. For example, as shown in FIGS. 2 to 4, the mesh opening part OA may a rectangular shape or diamond shape. Alternatively, the mesh opening part OA may have a polygonal shape such as a hexagonal shape, but the embodiment is not limited thereto and the mesh opening part OA may have various shapes such as a pentagon shape or a circular shape. In addition, the mesh opening part OA may have a regular shape or a random shape.

As the sensing electrode has a mesh shape, the pattern of the sensing electrode may not be visible in the active area AA. In other words, even when the sensing electrode is formed of metal, the pattern may not be visible. Even when the sensing electrode is applied to a large-size touch window, the resistance of the touch window may be reduced.

The sensing electrode 210 may further include a reinforcement part 240. The sensing electrode 210 may include at least one reinforcement part 240 connected to at least one mesh line of the first and second mesh lines 231 and 232. The reinforcement part 240 may include at least one reinforcement line 240 connected to at least one of the first and second mesh lines 231 and 232. Hereinafter, in the following descriptions about FIGS. 2 to 15, the reinforcement part 240 will be referred to as a reinforcement line for the purpose of convenience of explanation.

The reinforcement line 240 may be formed in the mesh opening part OA. The first and second mesh lines 231 and 232 and the reinforcement line 240 may include the same material. The reinforcement line 240 may be connected to at least one of the first and second mesh lines 231 and 232. Referring to FIG. 2, the reinforcement line 240 may be connected to the first and second mesh lines 231 and 232 adjacent thereto. Referring to FIG. 3, the reinforcement line 240 may be connected to the second mesh line 232.

Referring to FIG. 4, the reinforcement lines 240 may be connected with each other while crossing the first mesh lines 231 adjacent to each other and the second mesh lines 232 adjacent to each other. For example, the reinforcement lines 240 may extend in a direction corresponding to the first mesh lines 231 adjacent to each other and second mesh lines 232 adjacent to each other and may be connected with each other while crossing the first and/or second mesh lines 231 and/or 232.

The reinforcement line 240 may be spaced apart from a crossing area CA of the first and second mesh lines 231 and 232. For example, referring to FIG. 3, the reinforcement line 240 may be disposed between the first mesh lines 231 or the second mesh lines 232, and first and second crossing areas CA1 and CA2, in which the first and second mesh lines 231 and 232 overlap each other to face each other, may be formed on the first and second mesh lines 231 and 232.

The distance d1 between the reinforcement 240 and the first crossing area CA1 may be about 0.2 to about 0.4 times of the distance d3 between the first crossing area CA1 and the second crossing area CA2. The distance d2 between the reinforcement line 240 and the second crossing area CA2 may be about 0.2 to about 0.4 times of the distance d3 between the first crossing area CA1 and the second crossing area CA2.

Referring to FIG. 4, the reinforcement lines 240 may be connected to each other between the first mesh lines 231 and the second mesh lines 232, and the first and second crossing areas CA1 and CA2, in which the first and second mesh lines 231 and 232 overlap each other to face each other, may be formed on the first and second mesh lines 231 and 232.

The distance d1 between the reinforcement 240 and the first crossing area CA1 may be about 0.2 to about 0.4 times of the distance d3 between the first crossing area CA1 and the second crossing area CA2. The distance d2 between the reinforcement line 240 and the second crossing area CA2 may be about 0.2 to about 0.4 times of the distance d3 between the first crossing area CA1 and the second crossing area CA2.

When the distance between the reinforcement line 240 and the first or second crossing area is less than about 0.2 times of that between the first and second crossing areas CA1 and CA2, the ESD induced to the reinforcement line may exert an influence even on the mesh line, so that the mesh line may be short-circuited. When the distance between the reinforcement line 240 and the first or second crossing area is equal to or greater than about 0.4 times of that between the first and second crossing areas CA1 and CA2, the ESD may not be easily induced into the reinforcement line.

Figure 7:
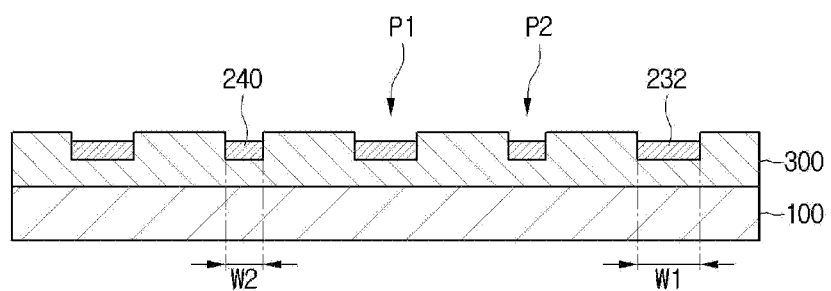
FIG. 7 is a sectional view taken along line B-B' of FIG. 4.
Figure 8:
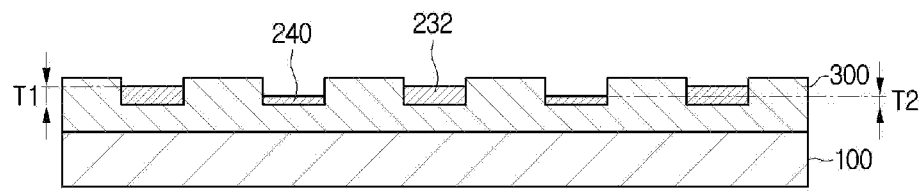
FIG. 8 is another sectional view taken along line B-B' of FIG. 4.
Figure 9:
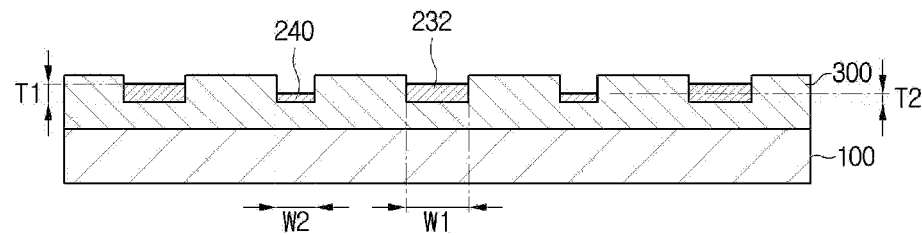
FIG. 9 is still another sectional view taken along line B-B' of FIG. 4.

FIGS. 7 to 9 are sectional views taken along line B-B' of FIG. 4. Referring to FIGS. 7 to 9, a base substrate 300 may be disposed on the substrate 100 and an electrode may be disposed in a concave pattern P formed in the base substrate 300. That is, the mesh line and the reinforcement line may be disposed in the pattern P formed in the base substrate 300.

The base substrate 300 may be a resin layer including UV resin or thermosetting resin. Patterns P filled with an electrode material may be formed on the base substrate 300. That is, the first patterns P1, which has a mesh shape to dispose the mesh lines therein, and the second patterns P2 to dispose the reinforcement line 240 therein may be formed on the base substrate 300.

The first and second patterns P1 and P2 may be formed by using a convex or concave mold. For example, when a convex pattern is to be formed on the base substrate 300, the base substrate 300 is imprinted with a concave mold so that the corresponding pattern may be formed. As shown in FIGS. 7 to 9, when a concave pattern is to be formed, the base substrate 300 is imprinted with a convex mold, so that the corresponding pattern may be formed.

The reinforcement line 240 may have a size different from that of at least one of the first and second mesh lines 231 and 232. For example, referring to FIG. 7, the reinforcement line 240 may have a line width different from that of at least one of the first and second mesh lines 231 and 232. In detail, the line width W2 of the reinforcement line 240 may be less than a line width W1 of one mesh line having a smaller line width between the first and second mesh lines 231 and 232.

Referring to FIG. 8, the reinforcement line 240 may have a thickness different from that of at least one of the first and second mesh lines 231 and 232. In detail, the thickness T2 of the reinforcement line 240 may be less than the thickness T1 of one mesh line having a thinner thickness between the first and second mesh lines 231 and 232.

The reinforcement line 240 may have a line width and a thickness different from those of at least one of the first and second mesh lines 231 and 232. In detail, the line width W2 and the thickness T2 of the reinforcement line 240 may be less than the line width W1 and the thickness T1 of one mesh line having smaller line width and thickness between the first and second mesh lines 231 and 232.

At least one of the first and second mesh lines 231 and 232 may have a line width in the range of about 0.1 μm to about 10 μm It may be difficult to implement the mesh line having a line width less than about 0.1 μm and when the line width of the mesh line exceeds about 10 μm the mesh line may be viewed from an outside so that the visibility may be degraded. At least one of the first and second mesh lines 231 and 232 may have a line width in the range of about 1 μm to about 7 μm or about 1.5 μm to about 3.5 μm and the reinforcement line 240 may have a line width narrower than that of one mesh line having a smaller line width between the first and second mesh lines 231 and 232.

The reinforcement line 240 may have a cross sectional area different from that of at least one of the first and second mesh lines 231 and 232. The cross sectional area of the reinforcement line 240 may be smaller than that of one cross sectional area having a smaller cross sectional area between the first and second mesh lines 231 and 232.

The cross sectional area of the reinforcement line 240 may be equal to or less than about 50% of the cross sectional area of at least one of the first and second mesh lines 231 and 232. In detail, the reinforcement line 240 may have a cross sectional area in the range of about 15% to about 50% of a cross sectional area of at least one of the first and second mesh line 231 and 232.

When the cross sectional area of the reinforcement line 240 may be equal to or larger than about 50% of the cross sectional area of at least one of the first and second mesh lines 231 and 232, the ESD introduced from an outside may not efficiently migrate from the first or second mesh line 231 or 232 into the reinforcement line 240. The reinforcement line 240 having a cross sectional area less than about 15% of the cross sectional area of at least one of the first and second mesh lines 231 and 232 may not be implemented through the fabrication process.

Although the electrode disposed on the base substrate on the substrate is depicted in FIGS. 7 to 9, the embodiment is not limited thereto and it is possible to dispose the electrode, that is, the mesh lines and the reinforcement line directly on the substrate.

The reinforcement line 240 may have resistance different from that of at least one of the first and second mesh lines 231 and 232. The resistance of the reinforcement line 240 may be less than that of one of the first and second mesh lines 231 and 232, which is less than that of the other.

Figure 10:
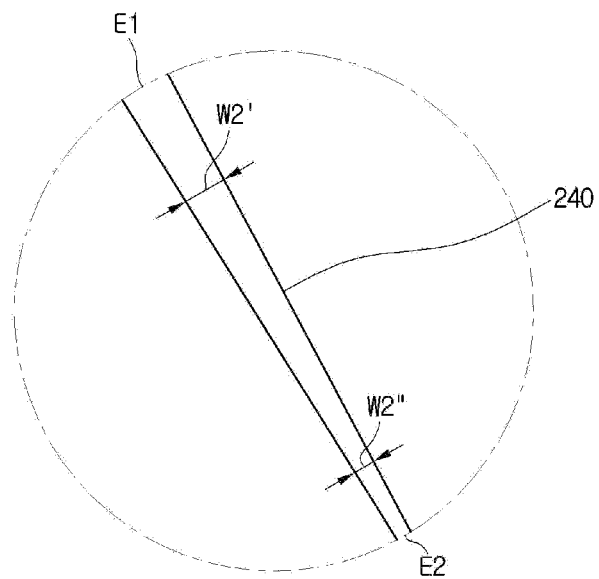
FIGS. 10 and 11 are enlarged views of area C of FIG. 4.
Figure 11:
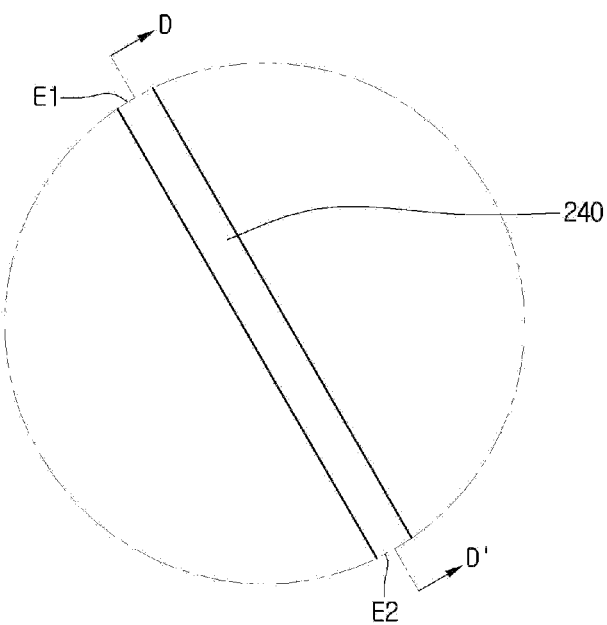
Figure 12:
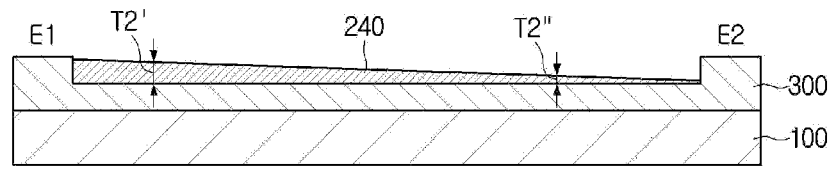
FIG. 12 is a sectional view taken along line D-D' of FIG. 11.

Referring to FIGS. 10 to 12, a size of the reinforcement line 240 may be entirely non-uniform. For example, referring to FIG. 10, the line width of the reinforcement line 24 may be entirely non-uniform. The reinforcement line 240 may extend from one end E1 to the opposite end E2, and the line width of the reinforcement line 240 may be gradually narrowed from one end E1 toward the opposite end E2. The line width of the reinforcement line 240 may be gradually narrowed from a first width W2 to a second width W2" while the reinforcement line 240 extends from the one end E1 to the opposite end E2.

Referring to FIGS. 11 and 12, the thickness of the reinforcement line 24 may be entirely non-uniform. The reinforcement line 240 may extend from the one end E1 to the opposite end E2, and the thickness of the reinforcement line 240 may be gradually thinned from the one end E1 toward the opposite end E2. In detail, the thickness of the reinforcement line 240 may be gradually thinned from a first thickness T2 to a second thickness T2" while the reinforcement line 240 extends from the one end E1 tow the opposite end E2. The width and thickness of the reinforcement line 240 may be gradually reduced while the reinforcement line 240 extends from the one end E1 to the opposite end E2.

Figure 13:
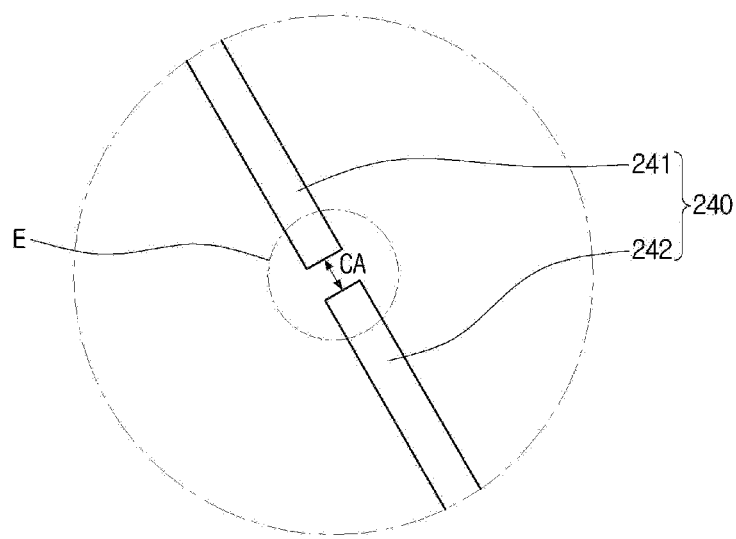
FIG. 13 is another enlarged view of area C of FIG. 4.

The reinforcement line 240 may include a cutting area CA. Referring to FIG. 13, the reinforcement line 240 may include the cutting area CA and may be divided into first and second reinforcement lines 241 and 242 through the cutting area CA. One ends of the first and second reinforcement lines 241 and 242 may have various shapes. For example, the one ends of the first and second reinforcement lines 241 and 242 may be formed to have widths gradually narrowed in the direction of the cutting area CA where the first and second reinforcement lines 241 and 242 face each other.

Figure 14:
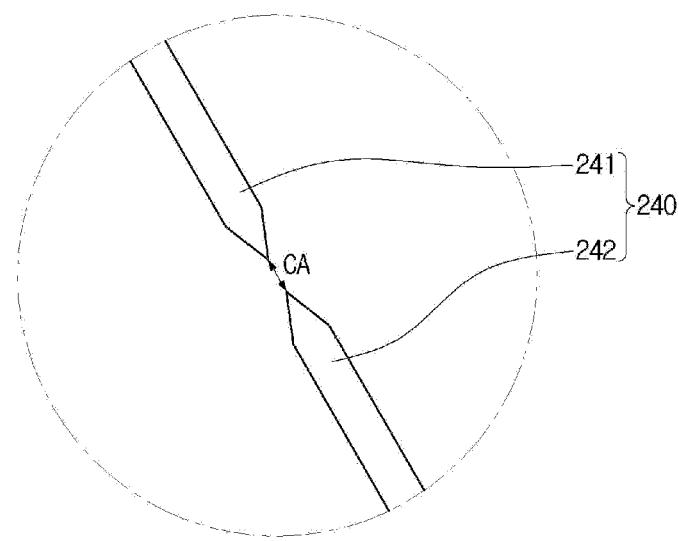
FIGS. 14 and 15 are enlarged views of area E of FIG. 13.
Figure 15:
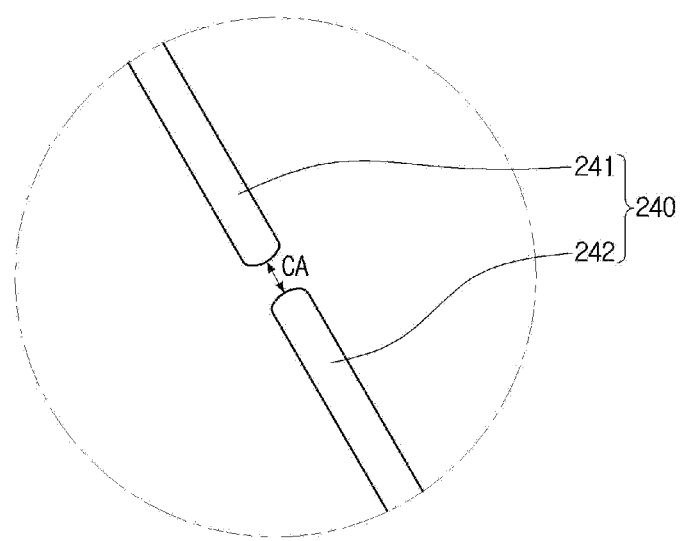

For example, as shown in FIG. 14, the one ends of the first and second reinforcement lines 241 and 242 may be sharpened to have the widths gradually narrowed in the direction of the cutting area CA where the first and second reinforcement lines 241 and 242 face each other. As shown in FIG. 15, the one ends of the first and second reinforcement lines 241 and 242 may be formed in a curved shape to have the widths gradually narrowed in the direction of the cutting area where the first and second reinforcement lines 241 and 242 face each other.

The touch window according to the embodiment may have improved reliability. The ESD introduced into the touch window may migrate to the mesh line, so that the mesh line may be cracked and short-circuited. The ESD may more easily migrate to a part having a narrow line width, a thin thickness, great resistance, or a non-uniform line width or thickness.

The touch window according to the embodiment may further include the reinforcement line connected to the mesh lines and having a line width or thickness less than or resistance greater than those of the mesh lines, so that the ESD introduced into an electrode may be induced to not any mesh lines but the reinforcement line.

Therefore, according to the touch window of the embodiment, ESD is induced to migrate into the reinforcement line, so that the electrode is prevented from being short-circuited due to the ESD, thereby improving the reliability of the touch window.

Figure 16:
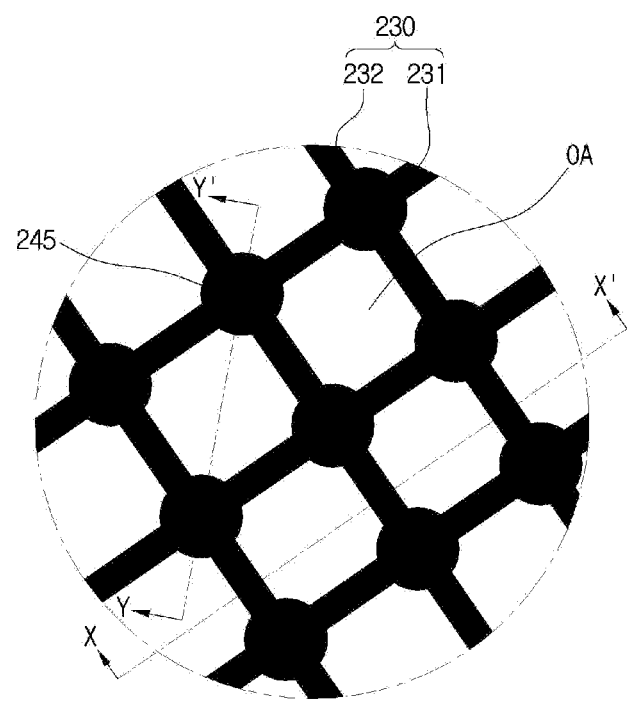
FIGS. 16 to 18 are still other views of area A of FIG. 1.
Figure 17:
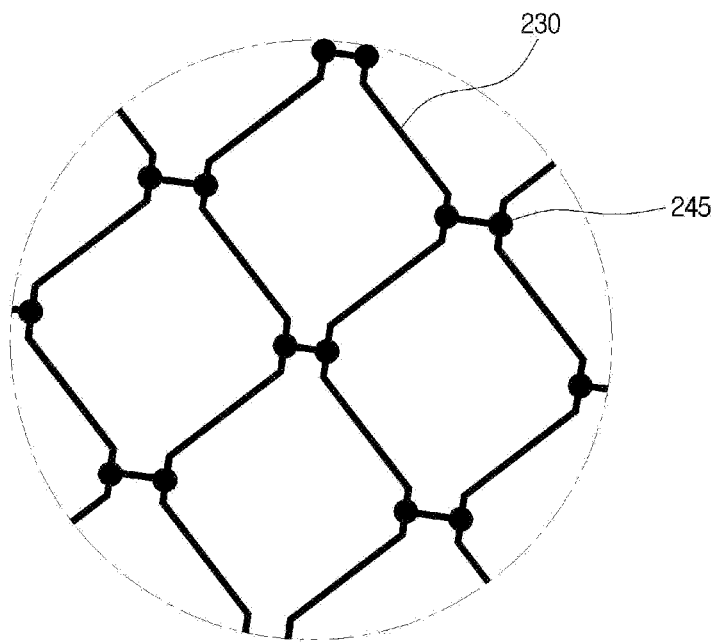
Figure 18:
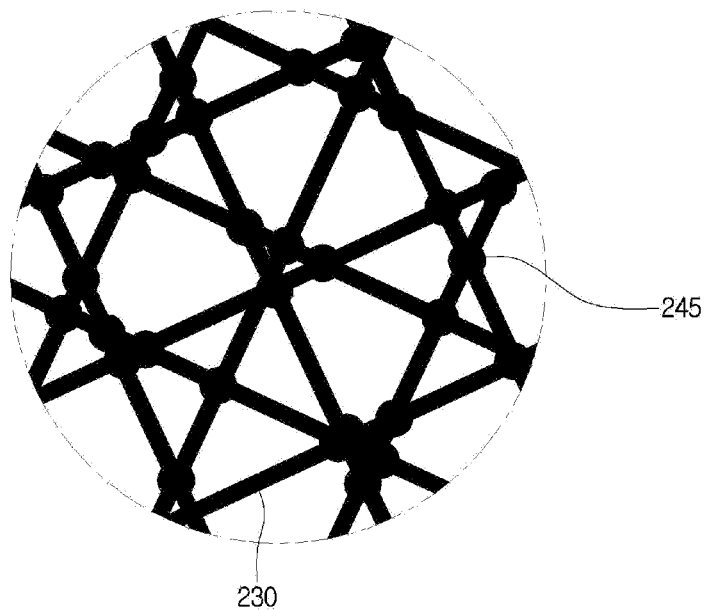

FIGS. 16 to 18 are other enlarged views of area A of FIG. 1. Referring to FIG. 16, the sensing electrode 210 may include a plurality of first and second mesh lines 231 and 232 crossing each other in a mesh shape, and a mesh opening part OA may be formed between the mesh lines 230 by the first and second mesh lines 231 and 232.

The mesh lines 230 may extend in at least two directions to cross each other. For example, as shown in FIG. 16, the mesh lines may extend in two directions to cross each other, or, as shown in FIGS. 17 and 18, the mesh lines may extend in at least three directions to cross each other.

As describe above, as the mesh lines 230 cross each other, a cross area, in which the first and second mesh lines 231 and 232 cross each other, may be formed on the mesh line 230 in which a reinforcement part 245 may be disposed. That is, the sensing electrode 210 may include the mesh line 230 and the reinforcement part 245 disposed in the cross area in which the mesh lines 230 cross each other.

Figure 19:
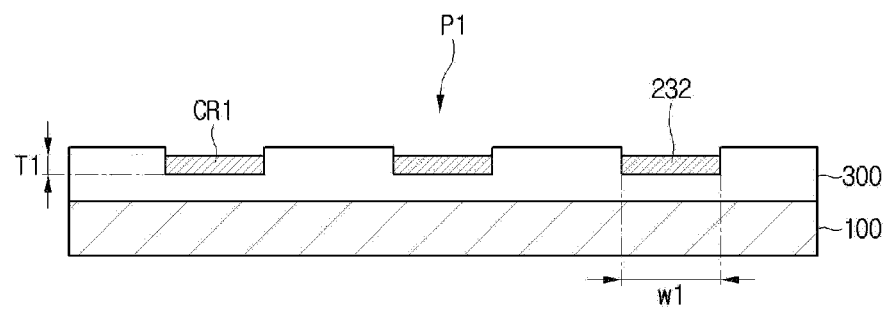
FIG. 19 is a sectional view taken along line X-X' of FIG. 16.
Figure 20:
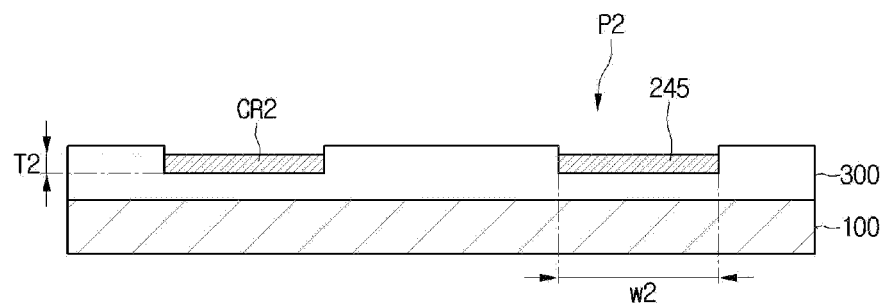
FIG. 20 is a sectional view taken along line Y-Y' of FIG. 16.

Referring to FIGS. 19 and 20, the first and second mesh lines 231 and 232 and the reinforcement part 245 may be disposed on the substrate 100. For example, a base substrate 300 including UV resin or thermosetting resin may be disposed on the substrate 100 and the first and second mesh lines 231 and 232 and the reinforcement part 245 may be disposed on the base substrate 300.

For example, the base substrate 300 may be a resin layer including UV resin or thermosetting resin. Patterns P filled with an electrode material may be formed on the base substrate 300. That is, the first patterns P1, which has a mesh shape to dispose the mesh lines therein, and the second patterns P2 to dispose the reinforcement line 240 therein may be formed on the base substrate 300.

The first and second patterns P1 and P2 may be formed by using a convex or concave mold. For example, when a convex pattern is to be formed on the base substrate 300, the base substrate 300 is imprinted with a concave mold so that the corresponding pattern may be formed. As shown in FIGS. 19 and 20, when a concave pattern is to be formed, the base substrate 300 is imprinted with a convex mold, so that the corresponding pattern may be formed.

The first and second patterns P1 and P2 may be formed at the same time, or the second pattern P2 may be formed after the first pattern P1 is formed.

Then, the first and second patterns P1 and P2 are filled with metallic paste including at least one of Cr, Ni, Cu, Au, Ti, Al, Ag, Mo and the alloy thereof, so that the electrode 200 including the first and second mesh lines 231 and 232 and the reinforcement part 245 may be formed.

The reinforcement part 245 may have a size different from that of at least one of the first and second mesh lines 231 and 232. For example, the size of at least one of the first and second mesh lines 231 and 232 may be smaller than that of the reinforcement part 245. That is, the reinforcement part 245 may have a size larger than at least one of the first and second mesh lines 231 and 232.

A width of the reinforcement part 245 may be wider than that of at least one of the first and second mesh lines 231 and 232. For example, referring to FIGS. 19 and 20, at least one of the first and second mesh lines 231 and 232 may have a first line width W1 and the reinforcement part 245 may have a second line width W2. In addition, the second line width W2 may be greater than the first line width W1.

The second lie width W2 may be less than two times of the first line width W1. For example, the second line width W2 may be wider than the first line width W1 and less than two times of the first line width W1.

When the second line width W2 is narrower than the first line width W1, ESD may easily migrate in the crossing area having a width narrower than the mesh lines, so that a crack or short occurs in the cross area of the mesh lines, thereby deteriorating the reliability. In addition, when the second line width W2 exceeds two times of the first line width W1, due to the difference between the first and second line widths W1 and W2, the crossing area may be viewed from an outside so that the visibility may be degraded.

A cross sectional area of the reinforcement part 245 may be larger than that of at least one of the first and second mesh lines 231 and 232. For example, referring to FIGS. 19 and 20, at least one of the first and second mesh lines 231 and 232 may have a first cross sectional area CR1, and the reinforcement part 245 may have a second cross sectional area CR2. In addition, the second cross sectional area CR2 is larger than the first cross sectional area CR1.

The second cross sectional area CR2 may be less than two times of the first cross sectional area CR1. For example, the second cross sectional area CR2 is larger than the first cross sectional area CR1 and less than two times of the first cross sectional area CR1.

When the second cross sectional area CR2 is smaller than the first cross sectional area CR1, ESD may migrate into the crossing area having a cross sectional area smaller than the mesh lines, so that a crack or short occurs in the cross area of the mesh lines, thereby deteriorating the reliability. In addition, when the second cross sectional area C2 exceeds two times of the first cross sectional area C1, due to the difference between the first and second cross sectional areas C1 and C2, the crossing area may be viewed from an outside so that the visibility may be degraded.

A thickness of the reinforcement part 245 may be equal to or different from that of at least one of the first and second mesh lines 231 and 232. For example, the thickness T2 of the reinforcement part 245 may be less than the thickness T1 of at least one of the first and second mesh lines 231 and 232, the second line width W2 of the reinforcement part 245 may be wider than the first line width W1 of at least one of the first and second mesh lines 231 and 232, and the second cross sectional area CR2 of the reinforcement part 245 is larger than the first cross sectional area CR1 of at least one of the first and second mesh lines 231 and 232.

The reinforcement part 245 may be formed in various shapes. For example, the reinforcement part 245 may be formed in a shape different from that of at least one of the first and second mesh lines 231 and 232. For example, the reinforcement part 245 may be formed in various shapes such as a polygonal shape or a circular shape.

The touch window according to the embodiment may have improved reliability. The ESD introduced into the touch window may flows through the mesh line, so that the mesh line may be cracked and short-circuited due to the ESD.

The ESD may easily migrate to a part having a narrow line width, a thin thickness, great resistance, or a non-uniform line width or thickness. Thus, when metallic paste is filled into the crossing area of the mesh lines, in which the mesh lines overlap each other, that is, the mesh lines extend in mutually different directions, the cross area is less filled with the metallic paste than any other parts, so that the cross sectional area of the electrode in the crossing area may be smaller than those of the mesh lines. Thus, the ESD migrates into the crossing area so that the mesh lines may be short-circuited to each other or damaged.

Therefore, according to the touch window of the embodiment, the line width of the crossing area in which the mesh lines are connected to each other is enlarged by the mesh lines, so that the cross sectional area of the crossing area is larger than those of the mesh lines. So, the ESD introduced into the mesh electrode may migrate into the crossing area, so that the mesh lines are prevented from being cut off.

Therefore, according to the touch window of the embodiment, the mesh electrode is prevented from being damaged due to the ESD, so that the reliability of the touch window may be entirely improved.

The wire electrode 220 may be disposed to be connected to the sensing electrode 210. One end of the wire electrode 220 is connected to the sensing electrode 210 and the other end of the wire electrode 220 is connected to a printed circuit board, so that the touch signal sensed from the sensing electrode may be transferred to a driving chip mounted on the printed circuit board.

The wire electrode 220 may include a material equal to or similar to the sensing electrode 210. The wire electrode 220 may include a mesh shape. Further, the wire electrode may further include a reinforcement part connected to the wire electrode having the mesh shape. Since the reinforcement part is equal or similar to those described above, the description about the reinforcement part will be omitted.

Figure 21:
FIGS. 21 to 23 are views illustrating a process of forming an electrode of a touch window according to an embodiment.
Figure 21:
Figure 21:
Figure 22:
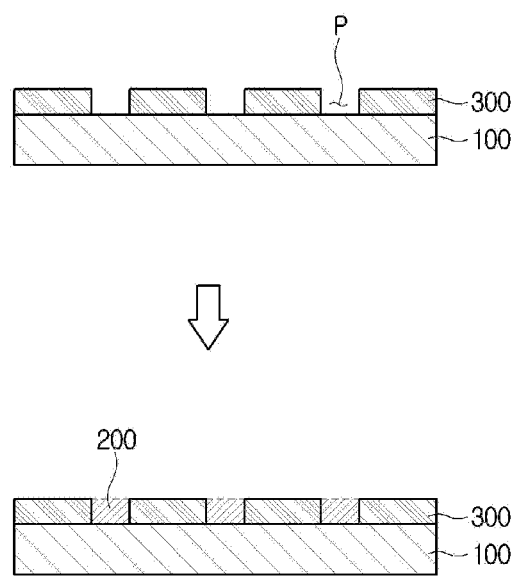
Figure 23:
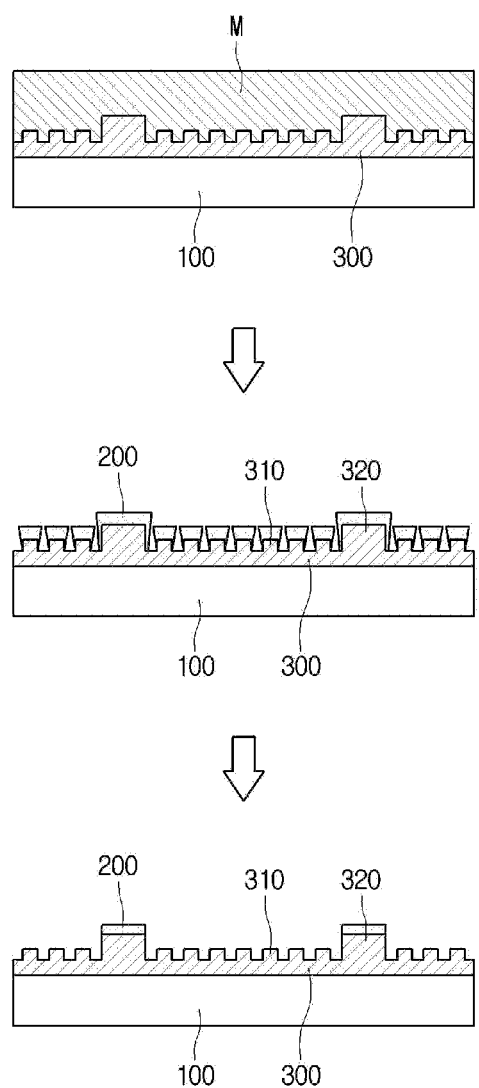

FIGS. 21 to 23 are views illustrating a process of forming a sensing electrode having a mesh shape and/or a wire electrode of a touch window according to an embodiment.

Referring to FIG. 21, after an electrode layer 200 including metal is provided on an entire surface of a substrate 100, the electrode layer 200 is etched in a mesh shape such that a sensing electrode and/or a wire electrode having a mesh-shape may be formed. For example, after a metal such as Cu is deposited on the entire surface of the substrate 100 including polyethylene terephthalate to form a Cu layer, a convex Cu mesh electrode having a mesh shape may be formed by etching the Cu layer.

Referring to FIG. 22, after a base substrate 300 including UV or thermosetting resin is disposed on the substrate 100 and a concave pattern P having a mesh shape is formed on the base substrate 300, the concave pattern is filled with metallic paste to form the electrode layer 200. In this case, the concave pattern of the base substrate may be formed by imprinting the base substrate with a mold having a convex pattern.

The metallic paste may include at least one of Cr, Ni, Cu, Al, Ag, Mo and the alloy thereof. When the metallic paste is filled into the concave pattern P having a mesh shape and the, is hardened, so that the convex metal mesh electrode may be formed.

Referring to FIG. 23, according to the sensing electrode and/or the wire electrode of the embodiment, after the base substrate 300 including UV resin or thermosetting resin is formed on the substrate 100, a convex nano-pattern and a micro-pattern having a mesh shape are formed on the base substrate 300, and then an electrode layer 200 including at least one of Cr, Ni, Cu, Al, Ag, Mo and the alloy thereof may be formed on the base substrate 300 through a sputtering scheme.

In this case, the convex patterns of the nano-pattern and micro-pattern may be formed by imprinting the base substrate with a mold having a corresponding concave pattern.

Then, the electrode layer formed on the nano-pattern and micro-pattern is etched to remove only the electrode layer on the nano-pattern and allow the electrode layer on the micro-pattern to remain, so that the metal electrode having a mesh shape may be formed.

In this case, when the metal layer is etched, a difference between the etching rates may occur due to a difference between the junction area of the nano-pattern and the metal layer and the junction area of the micro-pattern 320 and the metal layer. That is, since the junction area of the micro-pattern 320 and the metal layer is larger than the junction area of the nano-pattern and the metal layer, the electrode material on the micro-pattern is less etched, so that the metal layer on the micro-pattern remains and the metal layer on the nano-pattern 310 is removed by the same etching rate. Thus, the metal electrode having a convex mesh shape corresponding to the micro-pattern may be formed on the substrate 100.

FIGS. 24 to 27 are views showing various types of touch windows to which the reinforcement part according to an embodiment is applied.

Figure 24:
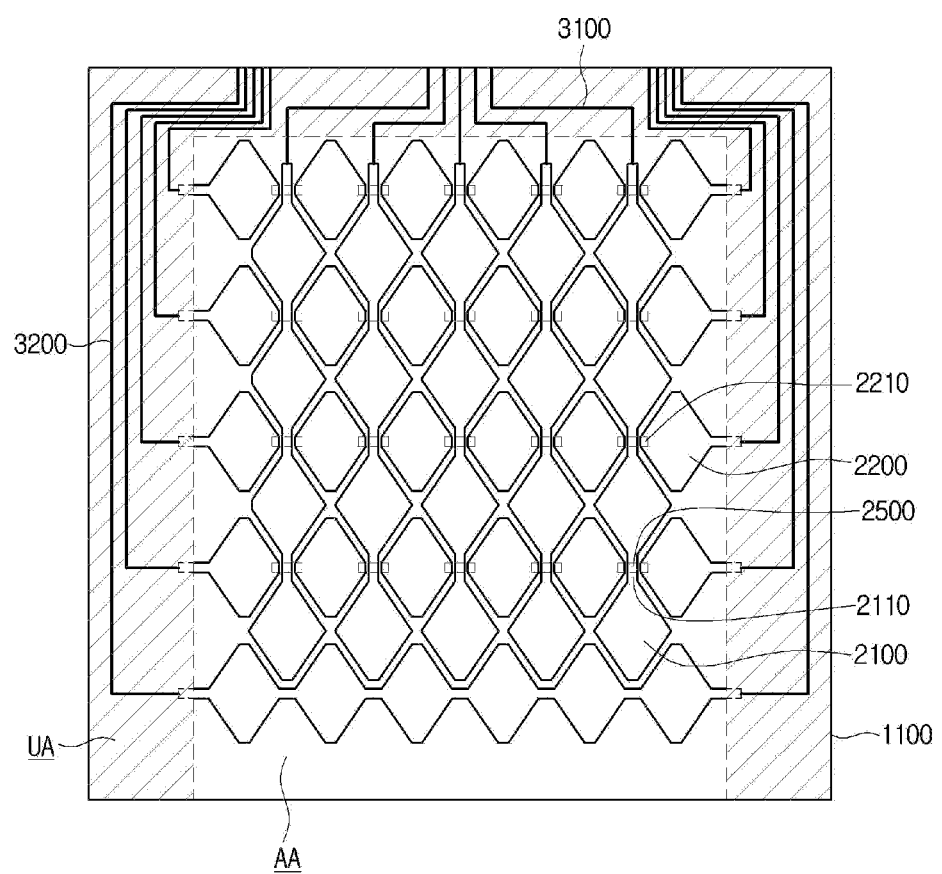
FIGS. 24 to 27 are views showing various types of touch windows to which the reinforcement part according to an embodiment is applied.

Referring to FIG. 24, a touch window 10 according to an embodiment may include a first substrate 1100, and first and second sensing electrodes 2100 and 2200 on the first substrate 1100. The first sensing electrode 2100 may extend in a first direction on the active area AA of the first substrate 1100. In detail, the first sensing electrode 2100 may be disposed on one surface of the first substrate 1100.

The second sensing electrode 2200 may extend in a second direction on the active area AA of the first substrate 1100. In detail, the second sensing electrode 2200 may be disposed on one surface of the first substrate 1100 while extending in the second direction different form the first direction. The first and second sensing electrodes 2100 and 2200 may extend in mutually different directions on the same surface of the first substrate 1100.

The first and second sensing electrodes 2100 and 2200 may be disposed on the same surface of the first substrate 1100 to be insulated from each other. In detail, the first sensing electrodes 2100 may be connected to each other through a first connecting electrode 2110 on which an insulating layer 2500 is disposed, and the second sensing electrode may be connected to each other through a second connecting electrode 2210 which is disposed on the insulating layer 2500.

The first and second sensing electrodes 2100 and 2200 may be disposed on the same surface of the first substrate 1100, that is, one surface in the active area AA to be insulated from each other without making contact with each other. The first substrate 1100 may be a cover substrate. The first and second sensing electrodes 2100 and 2200 may be disposed on the same surface of the cover substrate. In addition, a cover substrate may be further disposed on the first substrate 1100.

The first and second sensing electrodes 2100 and 2200 may be connected to the first and second wire electrodes 3100 and 3200 disposed on the unactive area UA. At least one of the first and second sensing electrodes 2100 and 2200 and the first and second wire electrodes 3100 and 3200 may be formed in a mesh shape including mesh lines, and the reinforcement parts described above may be disposed between the mesh lines.

Figure 25:
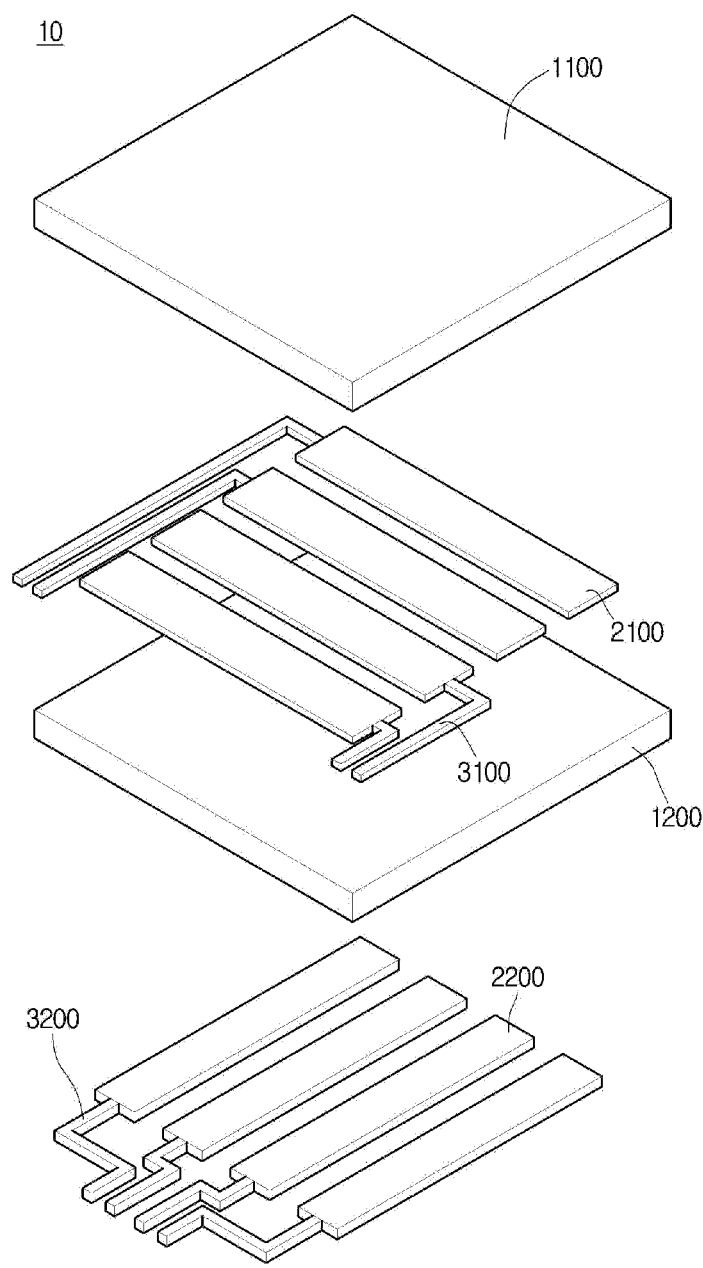

Referring to FIG. 25, the touch window 10 according to an embodiment may include the first and second substrates 1100 and 1200, the first sensing electrode on the first substrate 1100, and the second sensing electrode on the second substrate 1200.

The first sensing electrode 2100 extending in one direction and the first wire electrode 3100 connected to the first sensing electrode 2100 may be disposed on one surface of the first substrate 1100, and the second sensing electrode 2200 extending in another direction different from the one direction and the second wire electrode 3200 connected to the second sensing electrode 2200 may be disposed on one surface of the second substrate 1200.

At least one of the first and second sensing electrodes 2100 and 2200 and the first and second wire electrodes 3100 and 3200 may be formed in a mesh shape including mesh lines, and the reinforcement parts described above may be disposed between the mesh lines.

Figure 26:
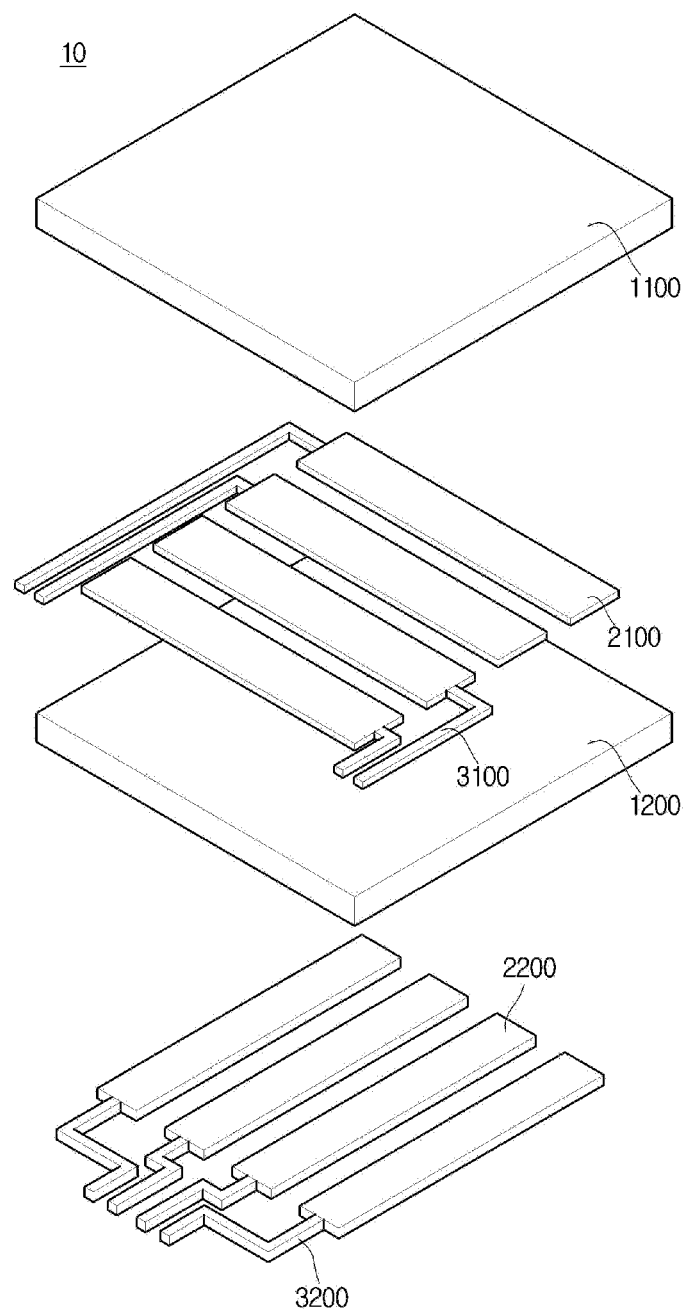

Referring to FIG. 26, the touch window 10 according to an embodiment may include the first and second substrates 1100 and 1200, and the first and second sensing electrodes on the second substrate 1200.

The first sensing electrode 2100 extending in one direction and the first wire electrode 3100 connected to the first sensing electrode 2100 may be disposed on one surface of the second substrate 1200, and the second sensing electrode 2200 extending in another direction different from the one direction and the second wire electrode 3200 connected to the second sensing electrode 2200 may be disposed on the opposite surface of the second substrate 1200.

At least one of the first and second sensing electrodes 2100 and 2200 and the first and second wire electrodes 3100 and 3200 may be formed in a mesh shape including mesh lines, and the reinforcement parts described above may be disposed between the mesh lines.

Figure 27:
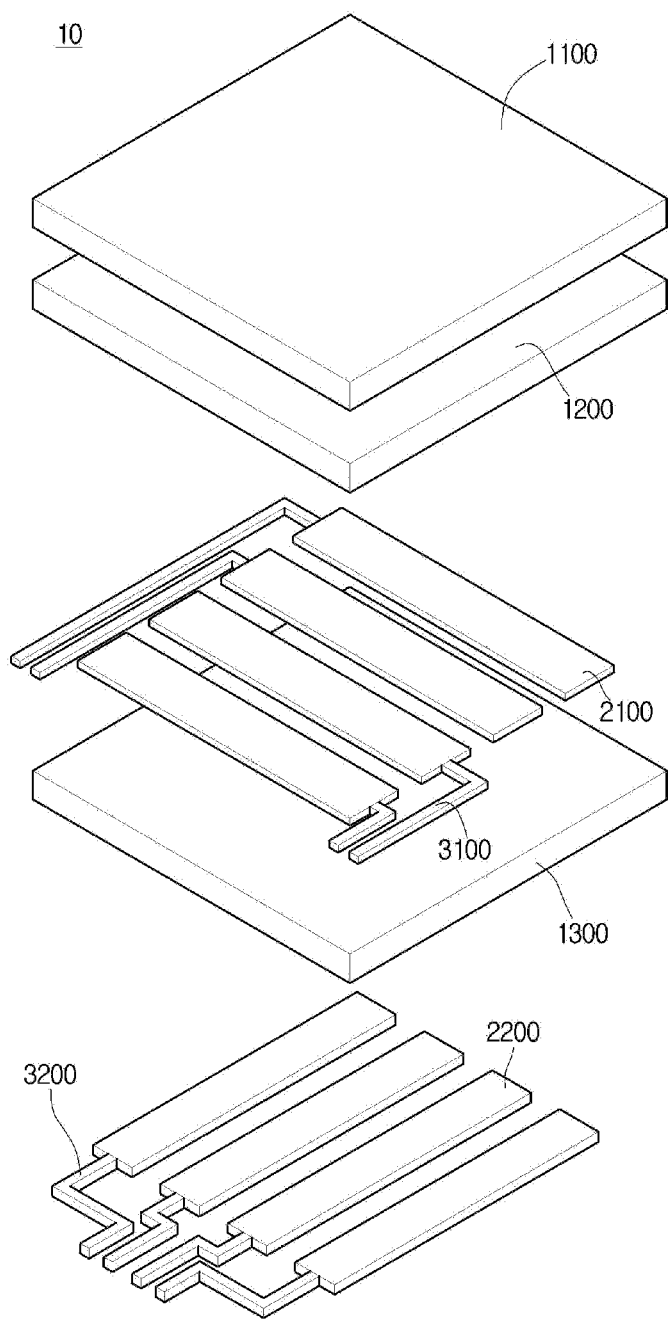

Referring to FIG. 27, the touch window 10 according to an embodiment may include the first to third substrates 1100 to 1300, the first sensing electrode on the second substrate 1200, and the second sensing electrode on the third substrate 1300.

The first sensing electrode 2100 extending in one direction and the first wire electrode 3100 connected to the first sensing electrode 2100 may be disposed on one surface of the second substrate 1200, and the second sensing electrode 2200 extending in another direction different from the one direction and the second wire electrode 3200 connected to the second sensing electrode 2200 may be disposed on one surface of the third substrate 1300.

At least one of the first and second sensing electrodes 2100 and 2200 and the first and second wire electrodes 3100 and 3200 may be formed in a mesh shape including mesh lines, and the reinforcement parts described above may be disposed between the mesh lines.

Figure 28:
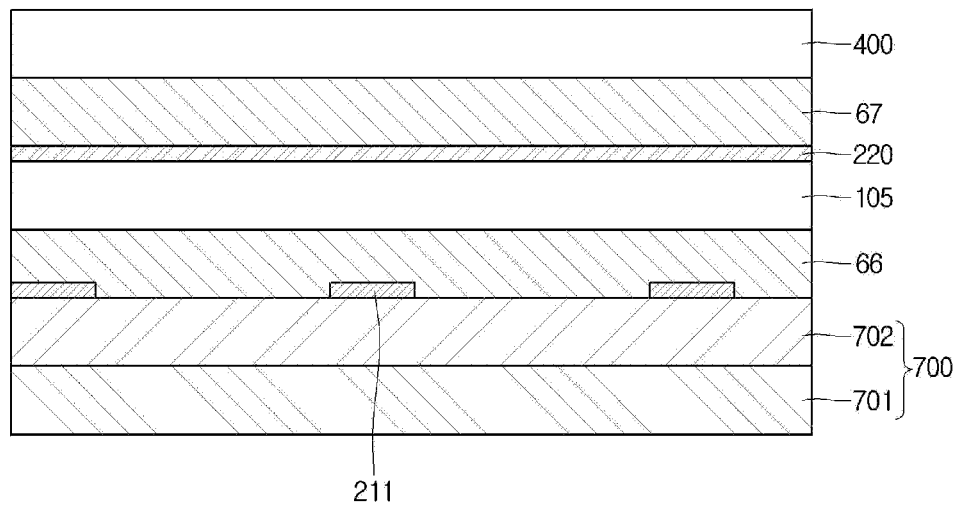
FIGS. 28 to 33 are views illustrating a touch device having an on-cell or in-cell structure, to which a touch window according to an embodiment is applied.
Figure 29:
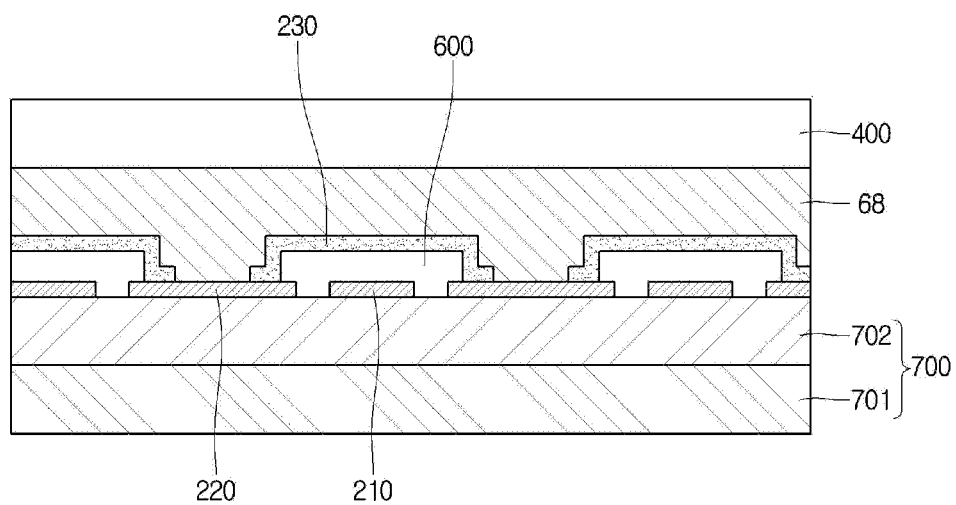

The touch window described above may be coupled to a display panel and may be applied to touch device. Referring to FIGS. 28 and 29, a touch device according to an embodiment may include a touch window integrated with a display panel 700. A substrate for supporting at least one sensing electrode may be omitted.

At least one sensing electrode may be formed on at least one of the display panel 700. The display panel 700 includes first and second substrates 701 and 702. That is, at least one sensing electrode may be formed on at least one of the first or second substrate 701 or 702.

When the display panel 700 is a liquid crystal display panel, the display panel 700 may be formed in a structure in which the first substrate 701 including thin film transistors and pixel electrodes and the second substrate 702 including color filter layers are combined with each other while interposing a liquid crystal layer therebetween.

In addition, the display panel 700 may be a liquid crystal display panel having a COT (color filter on transistor) structure in which the second substrate 702 is combined with the first substrate 701 on which a thin film transistor, a color filter and a black matrix are formed while a liquid crystal layer is interposed between the first and second substrates 701 and 702. That is, the thin film transistor is formed on the first substrate 701, the protective layer is formed on the thin film transistor, and the color filter layer is formed on the protective layer. In addition, the pixel electrode making contact with the thin film transistor is formed on the first substrate 701. In this case, in order to improve an aperture rate and simplify a mask process, the black matrix may be omitted and a common electrode may be formed to serve as the black matrix.

When the display panel 700 is a liquid crystal panel, the display device may further include a backlight unit for providing light at the back of the display panel 700.

When the display panel 700 is an organic light emitting device, the display panel 700 includes a self light-emitting device which does not require any additional light source. A thin film transistor is formed on the first substrate 701 of the display panel 700, and an organic light-emitting device (OLED) making contact with the thin film transistor is formed. The OLED may include an anode, a cathode and an organic light-emitting layer formed between the anode and the cathode. In addition, the display panel 700 may further include the second substrate 702, which performs the function of an encapsulation substrate for encapsulation, on the OLED.

In this case, at least one sensing electrode may be formed on a top surface of the substrate disposed at an upper portion. Although a configuration of forming the sensing electrode on the top surface of the second substrate 702 is depicted in the drawings, if the sensing electrode is disposed on the first substrate 701, at least one sensing electrode may be formed on the top surface of the first substrate 701.

Referring to FIG. 28, the first sensing electrode 211 may be formed on the top surface of the display panel 700. In addition, the first wire connected to the first sensing electrode 211 may be formed. The touch substrate 105, on which the second sensing electrode 212 and the second wire are formed, may be formed on the display panel 700 on which the first sensing electrode 212. A first adhesive layer 66 may be formed between the touch substrate 105 and the display panel 700.

Although the second sensing electrode 212 formed on the top surface of the touch substrate 105 and the cover substrate 400 disposed on the touch substrate while a second adhesive layer 67 is interposed between the second sensing electrode 212 and the cover substrate 400 are depicted in the drawings, the embodiment is not limited thereto. The second sensing electrode 220 may be formed on a rear surface of the touch substrate 105. In this case, the touch substrate 105 may serve as the cover substrate.

The embodiment is not limited to the drawings and is sufficient if the touch device has a structure in which the first sensing electrode 211 is formed on the top surface of the display panel 700, the touch substrate 105 supporting the second sensing electrode 212 is disposed on the display panel 700, and the touch substrate 105 is combined with the display panel 700.

The touch substrate 105 may be a polarizing plate. That is, the second electrode 212 may be formed on a top or rear surface of the polarizing plate. Thus, the second sensing electrode and the polarizing plate may be integrally formed.

A polarizing plate may be further provided without regard to the touch substrate 105. In this case, the polarizing plate may be disposed below the touch substrate 105. For example, the polarizing plate may be interposed between the touch substrate 105 and the display panel 700. In addition, the polarizing plate may be disposed on the touch substrate 105.

The polarizing plate may be a linear polarizing plate or an anti-reflection polarizing plate. For example, when the display panel 700 is a liquid crystal display panel, the polarizing plate may be a linear polarizing plate. In addition, when the display panel 700 is an organic electroluminescent display panel, the polarizing plate may be an anti-reflection polarizing plate.

Referring to FIG. 29, the first and second sensing electrodes 211 and 212 may be formed on the top surface of the display panel 700. In addition, the first wire connected to the first sensing electrode 211 and the second wire connected to the second sensing electrode 212 may be formed on the top surface of the display panel 700.

An insulating layer 600 exposing the second sensing electrode 212 may be formed on the first sensing electrode 211. A bridge electrode 250 for connecting the second sensing electrodes 212 to each other may be further formed on the insulating layer 600.

The embodiment is not limited just to the drawings. The first sensing electrode 211 and the first and second wires may be formed on the top surface of the display panel 700, and the insulating layer may be formed on the first sensing electrode 211 and the first wire. The second electrode 212 may be formed on the insulating layer, and a connecting part for connecting the second sensing electrode 212 and the second wire to each other may be further included.

The first and second sensing electrodes 211 and 212 and the first and second wires may be formed on the top surface of the display panel 700 in the active area. The first and second sensing electrodes 211 and 212 may be spaced apart from and adjacent to each other. That is, the insulating layer and the bridge electrode may be omitted.

The embodiment is not limited to the drawings, and it is sufficient if the first and second sensing electrodes 211 and 212 are formed on the display panel 700 without any additional substrates supporting the sensing electrodes.

The cover substrate 400 may be disposed on the display panel 700 while an adhesive layer 68 is interposed between the cover substrate and the display panel 700. In this case, a polarizing plate may be disposed between the display panel 700 and the cover substrate 400.

A touch device according to an embodiment may allow at least one substrate supporting a sensing electrode to be omitted. For this reason, a touch device having a thin thickness and a light weight may be formed.

Next, a touch device according to still another embodiment, to which the touch windows according to the embodiments described above are applied, will be described with reference to FIGS. 30 to 33. The same description as that in the above-described embodiment will be omitted in order to avoid redundancy. The same reference numerals will be used to refer to the same elements.

Referring to FIGS. 30 to 33, a touch device according to an embodiment may include a touch window formed integrally with a display panel. That is, a substrate supporting at least one sensing electrode may be omitted. All substrates supporting sensing electrodes may be omitted.

A sensing electrode, which serves as a sensor disposed in an active area to sense a touch, and a wire, to which an electrical signal is applied, may be formed inside the display panel. In detail, at least one sensing electrode or at least one wire may be formed inside the display panel.

The display panel includes first and second substrates 701 and 702. In this case, at least one of the first and second sensing electrodes 211 and 212 is disposed between the first and second substrates 701 and 702. That is, at least one sensing electrode may be formed on at least one surface of the first or second substrate 701 or 702.

Referring to FIGS. 17 and 20, the first and second sensing electrodes 211 and 212 and the first and second wires may be disposed between the first and second substrates 701 and 702. That is, the first and second sensing electrodes 211 and 212 and the first and second wires may be disposed inside the display panel.

Figure 30:
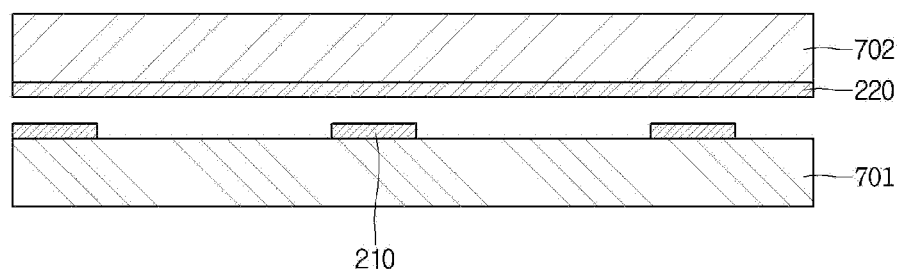
Figure 31:
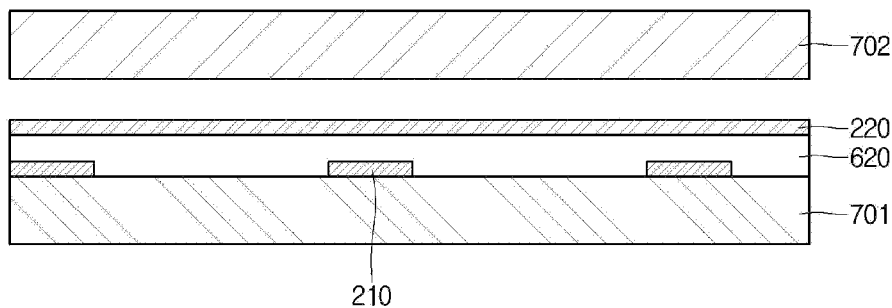
Figure 32:
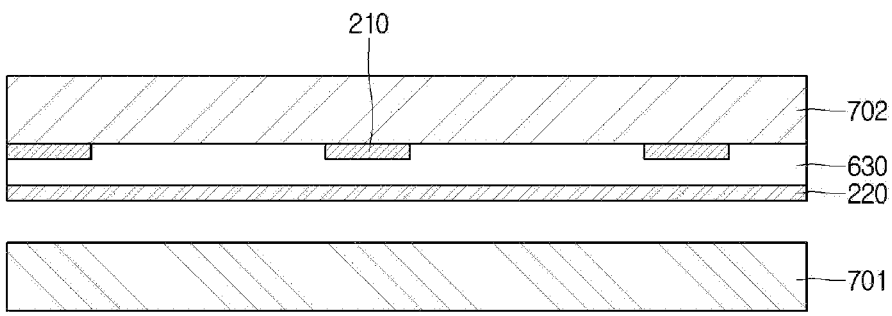

Referring to FIG. 30, the first sensing electrode 211 and the first wire may be formed on the top surface of the first substrate 701 of the display panel, and the second sensing electrode 212 and the second wire may be formed on a rear surface of the second substrate 702. Referring to FIG. 31, the first and second sensing electrodes 211 and 212 and the first and second wires may be formed on the top surface of the first substrate 701. An insulating layer 620 may be formed between the first and second sensing electrodes 211 and 212. In addition, referring to FIG. 32, the first and second sensing electrodes 211 and 212 may be formed on the rear surface of the second substrate 702. An insulating layer 630 may be formed between the first and second sensing electrodes 211 and 212.

Figure 33:
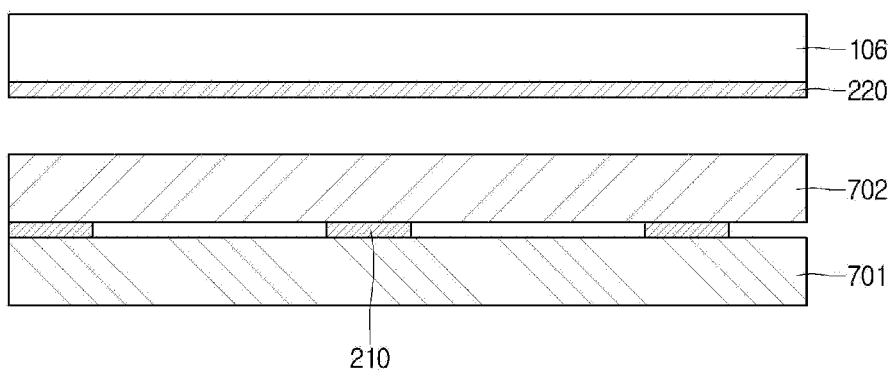

Referring to FIG. 33, the first sensing electrode 211 and the first wire may be formed between the first and second substrates 701 and 702. In addition, the second sensing electrode 212 and the second wire may be formed on the touch substrate 106. The touch substrate 106 may be disposed on the display panel including the first and second substrates 701 and 702. That is, the first sensing electrode 211 and the first wire may be disposed inside the display panel, and the second sensing electrode 212 and the second wire may be disposed outside the display panel.

The first sensing electrode 211 and the first wire may be formed on the top surface of the first substrate 701 or the rear surface of the second substrate 702. In addition, the adhesive layer may be formed between the touch substrate 106 and the display panel. In this case, the touch substrate 105 may serve as the cover substrate.

Although the configuration of forming the second sensing electrode 212 on the rear surface of the touch substrate 106 is depicted in the drawings, but the embodiment is not limited thereto. The second sensing electrode 212 may be formed on the top surface of the touch substrate 106, and the cover substrate may be further formed while being interposed between the touch substrate 106 and the adhesive layer.

The embodiment is not limited to the drawings, and it is sufficient if the embodiment has a structure that the first sensing electrode 211 and the first wire are disposed inside the display panel and the second electrode 212 and the second wire are disposed outside the display panel.

The touch substrate 106 may be a polarizing plate. That is, the second sensing electrode 212 may be formed on the top or rear surface of the polarizing plate. Thus, the second sensing electrode may be formed integrally with the polarizing plate.

The polarizing plate may be further provided without regard to the touch substrate 106. In this case, the polarizing plate may be disposed below the touch substrate 106. For example, the polarizing plate may be interposed between the touch substrate 106 and the display panel. The polarizing plate may be disposed on the touch substrate 106.

When the display panel is a liquid crystal display panel and the sensing electrode is formed on the top surface of the first substrate 701, the sensing electrode may be formed together with a thin film transistor (TFT) and a pixel electrode. In addition, when the sensing electrode is formed on the rear surface of the second substrate 702, a color filter layer may be formed on the sensing electrode or the sensing electrode may be formed on the color filter layer. When the display panel is an organic light emitting device and the sensing electrode is formed on the top surface of the first substrate 701, the sensing electrode may be formed together with a thin film transistor or an organic light emitting device.

A touch device according to an embodiment may allow an additional substrate supporting a sensing electrode to be omitted. For this reason, a touch device having a thin thickness and a light weight may be formed. In addition, the sensing electrode and the wire are formed with a device formed on the display panel, so that the process may be simplified and the cost may be reduced.

One example of a display device to which a touch window including a fingerprint sensor is applied according to the embodiment described above, will be described with reference to FIGS. 34 to 37.

Figure 34:
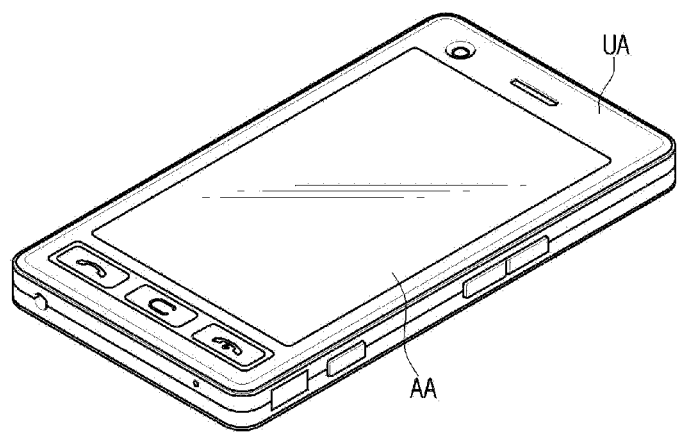
FIGS. 34 to 37 are views showing a touch device to which a touch window according to an embodiment is applied.

Referring to FIG. 34, there is shown a mobile terminal as one example of the touch device. The mobile terminal may include an active area AA and an unactive area UA. The active area AA may senses a touch signal generated when a finger touches the active area AA, and an instruction icon pattern part and a logo may be formed in the unactive area UA.

Figure 35:
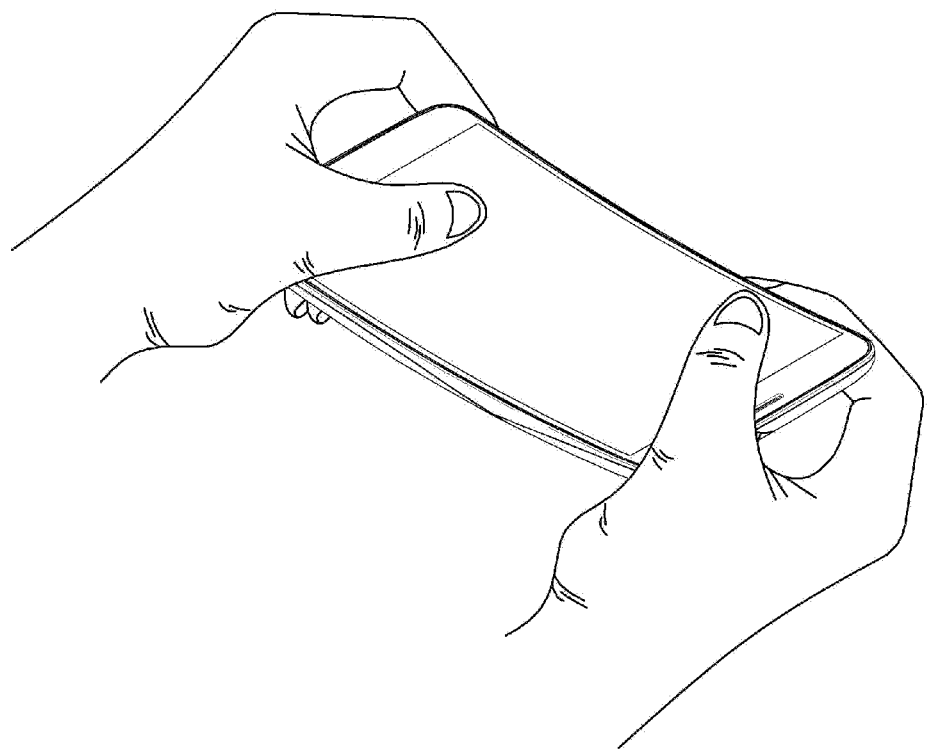

Referring to FIG. 35, the touch window may include a flexible touch window. Thus, a touch device including the flexible touch window may be a flexible touch device. Therefore, a user may bend or curve the flexible touch device with the hand of the user.

Figure 36:
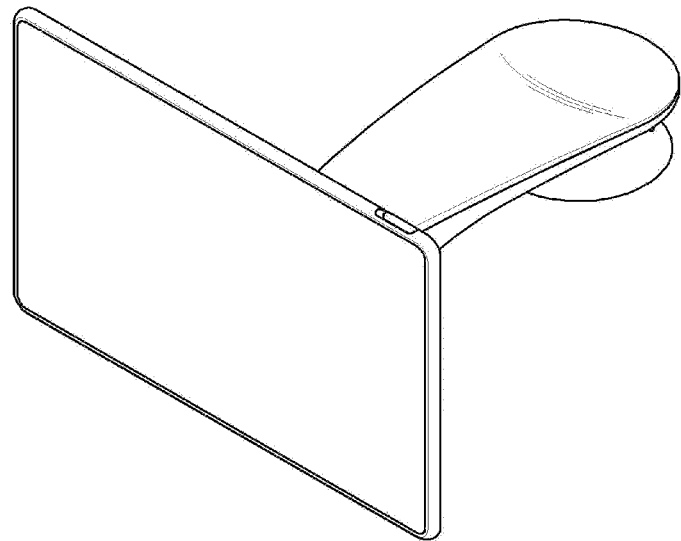
Figure 37:

Referring to FIG. 36, the touch window may be applied to a vehicle navigation system as well as a display device such as a mobile terminal. Further, referring to FIG. 37, the touch window may be applied to a vehicle. That is, the touch window may be applied to various parts in a vehicle to which a touch window is applicable. Accordingly, the touch window is applied to a dashboard as well as a PND (Personal Navigation Display) so that a CID (Center Information Display) may be implemented. However, the embodiment is not limited to the embodiment. In other words, the display may be used in various electronic products.

The embodiment is to provide a touch window having improved reliability.

According to the embodiment, there is provided a touch window which includes: a substrate; and an electrode on the substrate, wherein the electrode includes: a first mesh line; a second mesh line adjacent to the first mesh line; and a reinforcement part adjacent to the first or second mesh line.

The touch window according to the embodiment may have improved reliability. The ESD introduced into the touch window may flow through the mesh lines, so that the mesh lines may be cracked or short-circuited due to the ESD.

The ESD may migrate to a part having a narrow line width, a thin thickness, great resistance, or a non-uniform line width or thickness, so that the ESD may be carbonized.

The touch window according to an embodiment may further include a reinforcement line connected to mesh lines, wherein the reinforcement line is has a line width or a thickness less than that of each mesh line, or has a resistance greater than that of each mesh line, so that the ESD introduced into the electrode is induced to migrate to the reinforcement line.

In addition, according to the touch window of the embodiment, the line width of the crossing area in which the mesh lines are connected to each other is enlarged by the mesh lines, so that the cross sectional area of the crossing area is larger than those of the mesh lines. So, the ESD introduced into the mesh electrode may migrate into the crossing area, so that the mesh lines are prevented from being cut off.

Therefore, according to the touch window of the embodiment, the ESD may be induced to migrate into the reinforcement part, so that the electrode is prevented from being short-circuited due to the ESD, thereby improving the reliability of the entire touch window.

In the following description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
   a substrate; and
   an electrode on the substrate,
   wherein the electrode includes
      a first mesh line,
      a second mesh line adjacent to the first mesh line, and
      a reinforcement part adjacent to the first or second mesh line,
   wherein the reinforcement part includes a reinforcement line connected to at least one of the first mesh line or the second mesh line, and
   wherein the electrode includes first and second crossing areas which are defined by the first and second mesh lines crossing each other and face each other, and a distance between the reinforcement line and the first or second crossing area is 0.2 to 0.4 times of a distance between the first and second crossing areas.

2. The touch window of claim 1, wherein at least one of a width or a thickness of the reinforcement line is different from a width or a thickness of at least one of the first mesh line or the second mesh line.

3. The touch window of claim 2, wherein at least one of the width or the thickness of the reinforcement line is less than the line width or the thickness of at least one of the first mesh line or the second mesh line.

4. The touch window of claim 1, wherein a resistance of the reinforcement line is greater than a resistance of at least one of the first mesh line or the second mesh line.

5. The touch window of claim 1, wherein a cross sectional area of the reinforcement line is different from a cross sectional area of at least one of the first mesh line or the second mesh line.

6. The touch window of claim 5, wherein the cross sectional area of the reinforcement line is less than the cross sectional area of at least one of the first mesh line or the second mesh line.

7. The touch window of claim 5, wherein the cross sectional area of the reinforcement line is in a range of 15% to 50% of the cross sectional area of at least one of the first mesh line or the second mesh line.

8. The touch window of claim 1, wherein at least one of a width or a thickness of the reinforcement line gradually decreases from one end to an opposite end of the reinforcement line.

9. The touch window of claim 1, wherein the reinforcement line includes a cutting area.

10. The touch window of claim 9, wherein the reinforcement line has a width which is gradually narrowed in a direction of the cutting area.

11. The touch window of claim 1, wherein the electrode includes a plurality of reinforcement lines.

12. The touch window of claim 1, wherein the reinforcement line crosses at least one of the first and second mesh lines.

13. The touch window of claim 1, wherein the first and second mesh lines cross each other, and the reinforcement part is disposed in a crossing area in which the first and second mesh lines cross each other.

14. The touch window of claim 13, wherein a width of the reinforcement part is wider than a width of at least one of the first mesh line or the second mesh line.

15. The touch window of claim 13, wherein a cross sectional area of the reinforcement part is larger than a cross sectional area of at least one of the first mesh line or the second mesh line.

16. The touch window of claim 13, wherein a cross sectional area of the reinforcement part is larger than a cross sectional area of at least one of the first mesh line or the second mesh line, and is less than two times of the cross sectional area of at least one of the first mesh line or the second mesh line.

17. The touch window of claim 13, wherein a shape of the reinforcement part is different from a shape of at least one of the first mesh line or the second mesh line.

18. The touch window of claim 1, wherein
a thickness of the reinforcement part is thinner than a thickness of at least one of the first mesh line or the second mesh line,
a width of the reinforcement part is wider than a width of at least one of the first mesh line or the second mesh line, and
a cross sectional area of the reinforcement part is larger than a cross sectional area of at least one of the first mesh line or the second mesh line.

* * * * *